US006633316B1

(12) United States Patent
Maddalozzo, Jr. et al.

(10) Patent No.: US 6,633,316 B1
(45) Date of Patent: Oct. 14, 2003

(54) METHOD AND APPARATUS FOR IMPLEMENTING DIRECT LINK SELECTION OF CACHED, PREVIOUSLY VISITED LINKS IN NESTED WEB PAGES

(75) Inventors: John Maddalozzo, Jr., Austin, TX (US); Gerald Francis McBrearty, Austin, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/310,914

(22) Filed: May 13, 1999

(51) Int. Cl.[7] .................................................. G09G 5/00
(52) U.S. Cl. ....................... 345/854; 345/733; 345/738; 345/814; 345/817; 345/820; 345/841; 345/855; 709/203; 709/224; 715/526
(58) Field of Search ................................. 709/219, 203, 709/224; 345/10, 814, 817, 819, 820, 841, 733, 738, 854, 855; 715/526

(56) References Cited

U.S. PATENT DOCUMENTS

| | | | | |
|---|---|---|---|---|
| 5,742,768 A | * | 4/1998 | Gennaro et al. | |
| 5,801,702 A | * | 9/1998 | Dolan et al. | 345/733 |
| 5,954,798 A | * | 9/1999 | Shelton et al. | 709/224 |
| 5,960,429 A | * | 9/1999 | Peercy et al. | 707/5 |
| 5,963,208 A | * | 10/1999 | Dolan et al. | 345/760 |
| 5,974,445 A | * | 10/1999 | Pivnichny et al. | 709/203 |
| 5,978,828 A | * | 11/1999 | Greer et al. | 707/10 |
| 6,012,087 A | * | 1/2000 | Freivald et al. | 709/218 |
| 6,012,090 A | * | 1/2000 | Chung et al. | 709/218 |
| 6,021,435 A | * | 2/2000 | Nielsen | 345/738 |
| 6,035,332 A | * | 3/2000 | Ingrassia et al. | 709/224 |
| 6,069,630 A | * | 5/2000 | Lisle et al. | 345/804 |
| 6,282,548 B1 | * | 8/2001 | Burner et al. | 707/10 |
| 6,418,471 B1 | * | 7/2002 | Shelton et al. | 709/227 |
| 2001/0034814 A | * | 8/1997 | Rosenzweig | 711/118 |

OTHER PUBLICATIONS

Wexelblat, Alan, "History–Rich Tools For Social Navigation", MIT Media Lab, Software Agent Group, Wexelblat, 1998, pp. 1–17.*

Bederson, et al., article, "A Zooming Web Browser", 1997, Computer Science Department, Unviersity Of Mexico.*

Barrett, Rob, article, "How To Personalize The Web", 1997 IBM Almaden Research Center.*

Domel, Peter, "Webmap—A Graphical Hypertext Navigation Tool", 1994, Department Of Computer Science, J.W. Goethe— University of Frankfurt, pp. 1–12.*

* cited by examiner

Primary Examiner—Kenneth R. Coulter
Assistant Examiner—Hai V. Nguyen
(74) Attorney, Agent, or Firm—Duke W. Yee; Volel Emile; Stephen R. Tkacs

(57) ABSTRACT

A pointer is added to each web page identifier which points to the previous linking web page in the navigational path. Another pointer maybe added to each web page identifier which points to the next linking web page in the navigational path. In other embodiments, pointers may be added which reflect browser navigational paths from web pages. The browser is thereby enabled to store and display information regarding a navigational path for accessing linking network node addresses.

23 Claims, 17 Drawing Sheets

1400

```
┌─────────────────────────────────────────────────────────────────┐
│                                                         ? ▫ □ X │
├─────────────────────────────────────────────────────────────────┤
│   File     Edit    View     Go                                  │
├─────────────────────────────────────────────────────────────────┤
│                                                                 │
│  [ Back ]  [ Forward ]  [ Reload ]  [ Stop ]                    │
│                                                                 │
├─────────────────────────────────────────────────────────────────┤
│ Bookmarks  Location: http://164.195.100.11/netacgi/nph-Parser?Sec1=PTO1&Sec2+HITOFF&d=PALL ▼ │
├─────────────────────────────────────────────────────────────────┤
```

(1 of 1)

United States Patent                                    5,376,043
Carter                                          December 27, 1994
 Holder for various items, including, for example, a combined catfish holder & killer Abstract A holder usable to hold various food items, such as ham, chicken, etc., but particularly efficacious as a combined catfish killer and holder for skinning. The device includes a longitudinally extended, base platform (1); an upwardly extended, fish positioning, holding plate (2) at one end of the platform having a "V" shaped opening into which the fish's head is positioned; a killing spike (4) carried by a sleeve (5), which is carried by a laterally extending, "floating" top bar (6) slidingly mounted on the exterior sides of the diverging "V" legs (21); a laterally extended, stop railing (7) provided at the other end of the platform extending below its bottom (11); and a lateral trough (8) across the top (12) of the platform. In use, the head (H) end of the catfish (C) is positioned in the "V" shaped opening, while applying backward pressure on the fish, causing the fish's pectoral fins (F) to rest back against the distal sides of the "V", properly aligning the fish so that, when the top plate (2) is placed down on the "V", the fish's brain is in "perfect" alignment with the spike. The spike is hit with a mallet, and the fish is instantly killed, while the fish is held in triangulated fashion. The raised bottom (22) of the opening causes the part of the fish that is typically cut with a knife to be fully exposed, while also permitting clearance for the use of skinning pliers to pull the catfish's skin off. The fish may also be fileted while restrained in the holder.

Inventors: Carter; William D. (Rte. 6 Box 387, Lucedale, MS 39452)
Appl. No.: 73195
Filed:     December 22, 1993

U.S. Class:                                       452/195; 452/196; 452/65
Intern'l Class:                                                 A22C 025/06
Field of Search:                  452/195,196,185,65 269/53,54,54.1,54.5

| Title | Location | First Visit | Last Visit | Expiration |
|---|---|---|---|---|
| Formular One Search Engine | http://formula1search.com/ | 4/22/99 3:51 PM | 4/22/99 3:51 PM | 4/29/99 3:51 PM |
| Formula One Search Results | http://searchformula1search.com/search Text=patent Off ... | 4/22/99 3:55 PM | 4/22/99 3:55 PM | 4/29/99 3:55 PM |
| Patent and Trademark Office Home Page | http://www.uspto.gov/ | 4/22/99 3:58 PM | 4/22/99 3:58 PM | 4/29/99 4:08 PM |
| Databases: Patent Full Text and Bibliographic | http://www.uspto.gov/patft/index.html | 4/22/99 4:01 PM | 4/22/99 4:08 PM | 4/29/99 4:01 PM |
| US Patent Full-Text Database Boolean Search | http://164.195.100.11/netahtml/search-bool.html | 4/22/99 4:04 PM | 4/22/99 4:04 PM | 4/29/99 4:04 PM |
| US Patent Full-Text Database Manual Search | http://164.195.100.11/netahtml/search-adv.htm | 4/22/99 4:07 PM | 4/22/99 4:07 PM | 4/29/99 4:07 PM |
| US Patent Full-Text Database Number Search | http://164.195.100.11/netahtml/srchnum.htm | 4/22/99 4:09 PM | 4/22/99 4:09 PM | 4/29/99 4:09 PM |
| US Patent Database Search Results: PN/5376043 | http://164.195.100.11/netacgi/nph-Parser?TERM1=53760 ... | 4/22/99 4:17 PM | 4/22/99 4:17 PM | 4/29/99 4:17 PM |
| United States Patent 5,376,043 | http://164.195.100.11/netacgi/nph-Parser?Sect1=PT01& ... | 4/22/99 4:27 PM | 4/22/99 4:27 PM | 4/29/99 4:27 PM |

| Title | Location | First Visit | Last Visit | Expiration |
|---|---|---|---|---|
| Formular One Search Eng... | http://formula1search.com/ | 4/22/99 3:51 PM | 4/22/99 3:51 PM | 4/29/99 3:51 PM |
| Formula One Search Results | http://searchformula1search.com/searchText=patent Off... | 4/22/99 3:55 PM | 4/22/99 3:55 PM | 4/29/99 3:55 PM |
| Patent and Trademark Office Home Page | http://www.uspto.gov/ | 4:08 PM | 4:08 PM | 4/29/99 4:08 PM |
| Databases: Patent Full Text and Bibliographic | http://164.195.100.11/netahtml/ | 4:01 PM | 4:01 PM | 4/29/99 4:01 PM |
| US Patent Full-Text Database Boolean S... | http://164.195.100.11/netahtml/search-adv.htm | 4:04 PM | 4:04 PM | 4/29/99 4:04 PM |
| US Patent Full-Text Database Manual Se... | http://164.195.100.11/netahtml/srchnum.htm | 4/22/99 4:09 PM | 4/2 US Patent Database Search Results: PN/5376043 | |
| US Patent Full-Text Database Number Se... | http://164.195.100.11/netacgi/nph-Parser?TERM1=53760... | 4/22/99 4:19 PM | 4/22/99 4:19 PM | 4/29/99 4:19 PM |
| US Patent Database Search Results: PN/53... | http://164.195.100.11/netacgi/nph-Parser?Sect1=PT01&... | 4/22/99 4:27 PM | 4/22/99 4:27 PM | 4/29/99 4:27 PM |
| United States Patent 5,376,043 | | | | |

METHOD AND APPARATUS FOR IMPLEMENTING DIRECT LINK SELECTION OF CACHED, PREVIOUSLY VISITED LINKS IN NESTED WEB PAGES

BACKGROUND OF THE INVENTION

1. Technical Field

The present invention relates to the field of information storage technology. More particularly, the present invention relates to a means for prioritizing the storage of network nodes or web site addresses. Still more particularly, the present invention relates to a method and apparatus for designating certain nodes, links, or web addresses at the time of storage.

2. Description of Related Art

The worldwide network of computers commonly known as the "Internet" has seen explosive growth in the last, several years. Mainly, this growth has been fueled by the introduction and widespread use of so-called "web browsers," which enable simple graphical user interface-based access to network servers, which support documents formatted as so-called "web pages." A browser is a program which is executed on a graphical user interface (GUI),which allows a user to read hypertext by means of the GUI. The browser gives some means of viewing the contents of web pages (or nodes) and of navigating from one web page to another.

Examples of browsers for the World-Wide Web (WWW) include: Netscape Navigator from Netscape Communications Corporation, 501 East Middlefield Road, Mountain View, Calif. 94043, U.S.A.; Microsoft Internet Explorer, based on NCSA Mosaic, available from Microsoft Corporation, Redmond, Wash.; NCSA Mosaic, first available from National Center for Supercomputing Applications in Urbana, Ill., U.S.A. and now affiliated with Netscape Communications Corporation, 501 East Middlefield Road, Mountain View, Calif. 94043, USA; Lynx, for use on cursor-addressable, character cell terminals or terminal emulators under Unix or VMS, developed by the University of Kansas, Lawrence, Kans.; and W3, a browser for Emacs, Extensible MACro System, a popular screen editor. Web browsers act as clients of remote web servers.

The WWW is a massive hypertext system that a computer user accesses using an information access apparatus such as a WWW browser computer application. The WWW browser application communicates with information provider apparatuses, such as WWW server computer applications, to obtain information and services in the form of web pages. These web pages are identified by unique Universal Resource Locators (URL). Typically, a browser application provides bookmark capability for storing URLs for user-selected web pages. This simplifies the user's future access to these bookmarked web pages.

The background of the World Wide Web (WWW), WWW browser applications and Uniform Resource Locators, are well described by reference to the first chapter of Instant HTML Web Pages by Wayne Ause, Ziff-Davis Press, ISBN 1-56276-363-6, copyright 1995, pages 1–15, hereby incorporated by reference as illustrative of the prior art. The URL specification, also incorporated by reference, is described in RFC1738 and can be found on the WWW at: http://www.cis.ohiostate.edu/htbin/rfc/rfc1738.html Although the invention applies to information access and information provider apparatus, WWW browser and WWW server applications are representative of the technology. As such, this application describes the invention within the context of a preferred embodiment utilizing WWW browser and WWW server applications.

As mentioned above, the WWW is a massive hypertext system. Thus, the information provided to a user often includes references to other related information. These references are via hypertext links. Activating these hypertext links often results in accessing completely different web pages (supplied from completely different WWW server applications on other computer systems) from the web page that contains the link. Thus, a user often follows many links to reach desired information or services. One difficulty when traversing these links is that the user often loses track of the sequence of links used to arrive at a particular web page. Thus, the user has difficulty returning to a web page of interest. A bookmark facility addresses this problem by providing a mechanism to store and recall specific web pages of interest. Each bookmark comprises the title of the web page and the URL used to access the web page. Additionally, bookmarks often contain the date the web page was last visited and the date the web page was bookmarked, along with additional information.

One problem with the current browser technology is that, after "web surfing," or browsing, the Internet, the user does not have the capability of recreating a browsing sequence after the browser has been closed. Current browsers allow users to revisit previously opened web pages by using a "Back" or "Reverse" tool which backtracks the user's browsing sequence one web page at a time. After the user has returned to a previous web page, the "Forward" tool is enabled, allowing the user to quickly browse forward to the forwardmost web page in the user's browsing sequence. While these tools give the user certain limited flexibility in revisiting web pages, the tools limit the user to a single branch in the browsing path.

For example, after opening a web page, the user may jump to a second web page using a hypertext link which is embedded in the open web page. If, after jumping to a second page, the user returns to the first page and then, using another hypertext, jumps to a third page, current browser technology does not allow the user to navigate back to the second page using the above described browser tools. Rather, in order to navigate from one page to another, the user must either: use the links embedded on a web page; enter the address of the page; or find the address of the second web page in the history table created from previous web pages visited and stored in the browser's web page cache.

Current browser technology only tracks a linear path, that is, one web page associated with each level of the path. As a result, the browser stores only a single path when the user navigates. Therefore, when jumping from a single web page to multiple web pages, or when creating multiple jumps from web pages at different levels of the navigation path, the browser stores only a single path, pruning all but the most recent jump from any one web page.

More importantly, current browser technology retains the navigation path only during the current session. No path information is retained after the browser is closed. The only means available for a user to track the navigation of a previous session is to open the history table and attempt to reconstruct a previous session's navigation path from the time stamp associated with each web page in the history table.

SUMMARY OF THE INVENTION

The present invention discloses a method and apparatus for storing and displaying information related to a navigational path for accessing linking network node addresses. A pointer is added to each web page identifier, which points to the previous linking web page in the navigational path. Another pointer maybe added to each web page identifier, which points to the next linking web page in the navigational path. In other embodiments, pointers may be added which reflect browser navigational paths from web pages.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 14 illustrates browser 1400, showing the results of the user's action on web page 1310;

FIG. 15 illustrates history table 1500, which is a tabular listing of that data;

FIG. 19 illustrates history table 1900, which includes an expanded path as disclosed in the preferred embodiment of the present invention.

DETAILED DESCRIPTION OF THE PREFERRED EMBODIMENT

Figure 1:
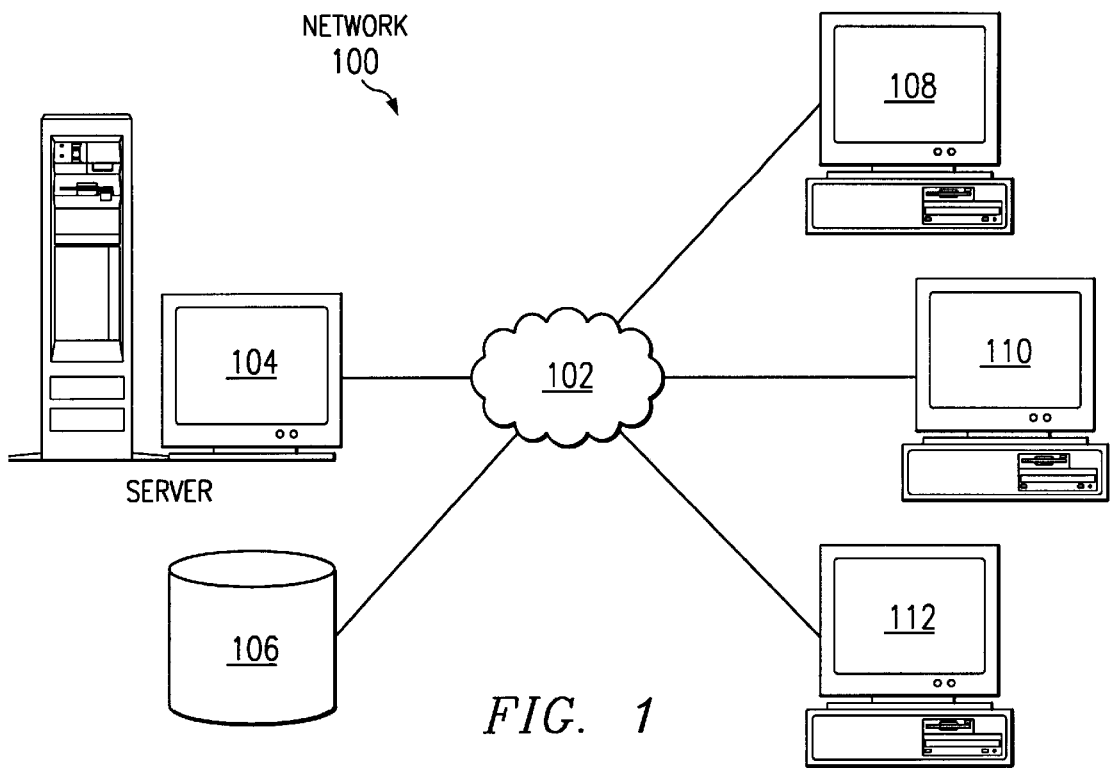
FIG. 1 depicts a distributed data processing system in which the present invention may be implemented.

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, server 104 is connected to network 102 along with storage unit 106. In addition, clients 108, 110 and 112 also are connected to network 102. These clients 108, 110 and 112 may be, for example, personal computers or network computers. For purposes of this application, a network computer is any computer coupled to a network which receives a program or other application from another computer coupled to the network. In the depicted example, server 104 provides data, such as boot files, operating system images, and.applications, to clients 108–112. Clients 108, 110 and 112 are clients to server 104. Distributed data processing system 100 may include additional servers, clients, and other devices not shown.

In the depicted example, distributed data processing system 100 is the Internet, with network 102 representing a worldwide collection of networks and gateways that use the transmission control protocol over internet protocol (TCP/IP) suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks, such as an intranet or a local area network.

FIG. 1 is intended as an example and not as an architectural limitation for the processes of the present invention.

Figure 2:
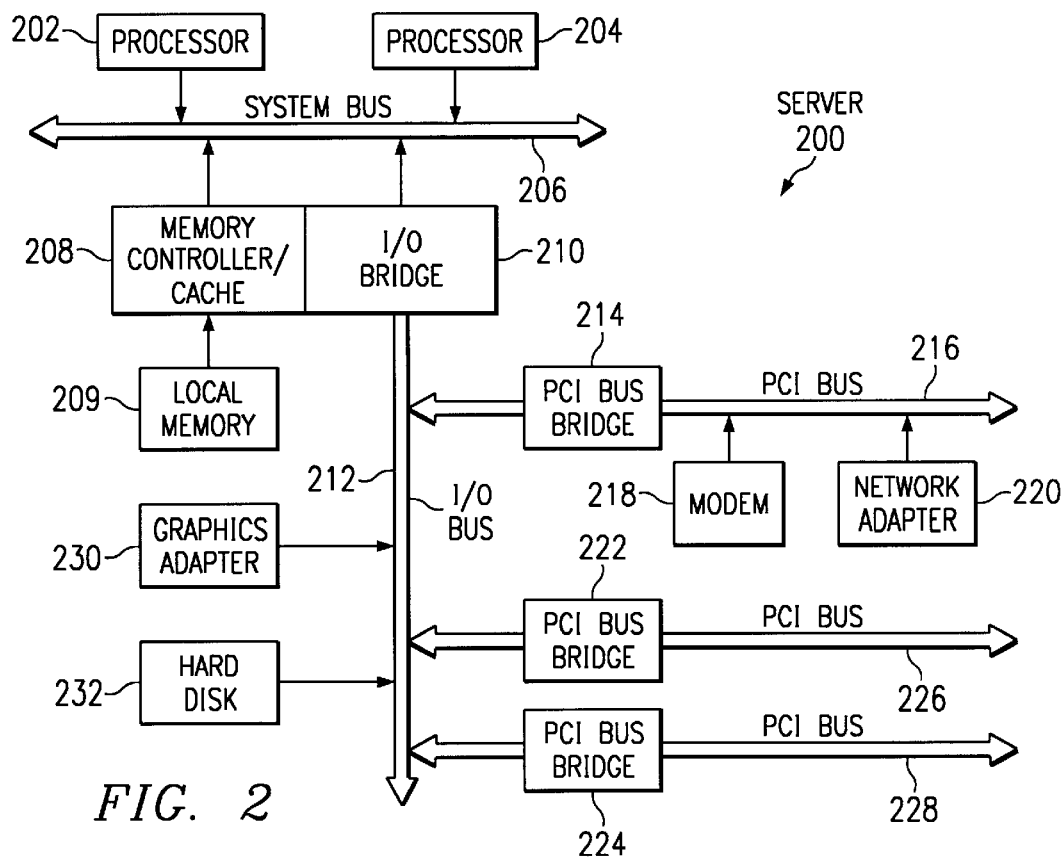
FIG. 2 is a block diagram illustrating a data processing system which may be implemented as a server in accordance with the present invention.

Referring to FIG. 2, a block diagram of a data processing system which may be implemented as a server, such as server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. Modem 218 and network adapter 220 may be connected to PCI bus 216. Typical PCI bus implementations support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used, in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
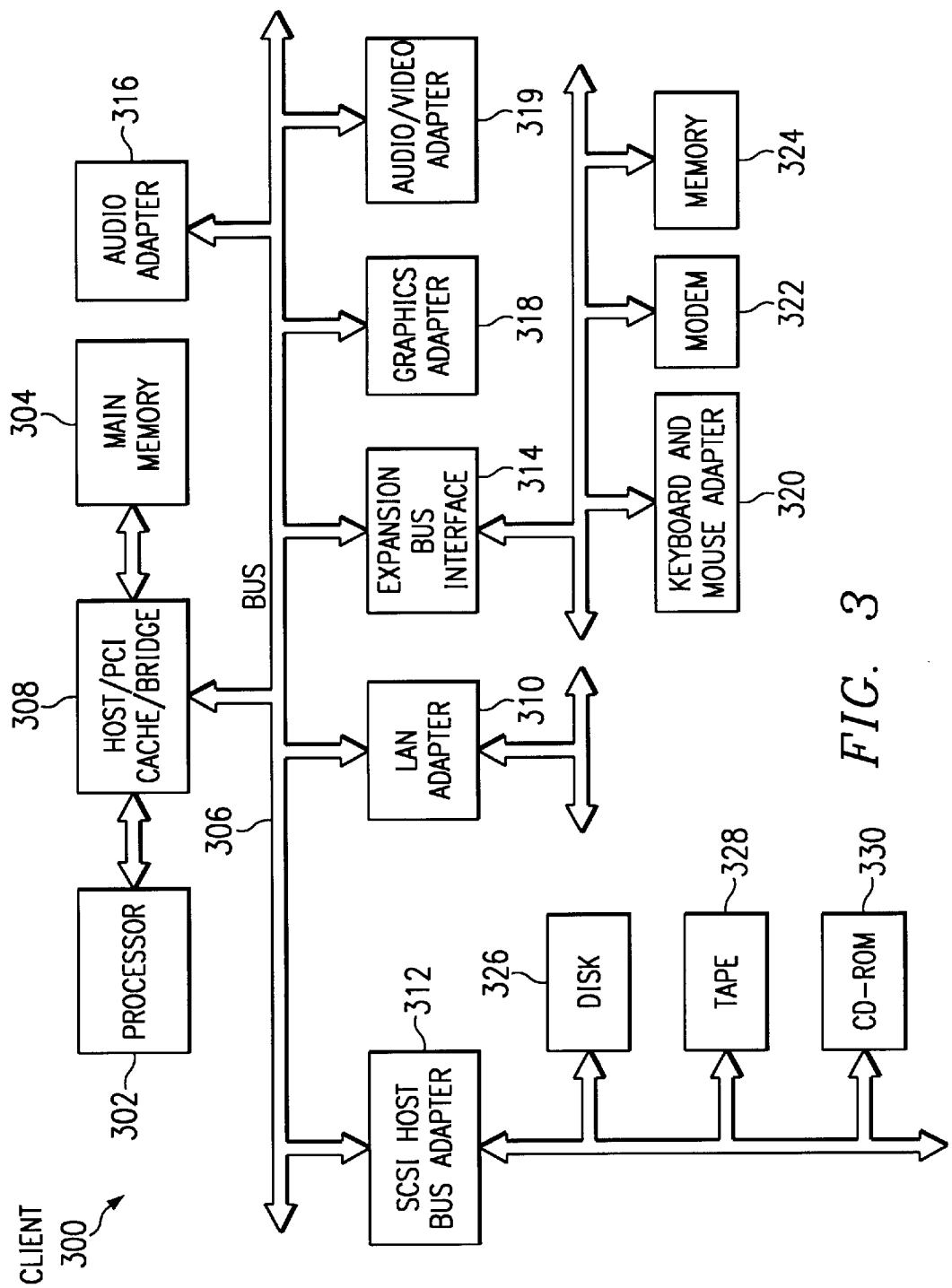
FIG. 3 is a block diagram illustrating a data processing system in which the present invention may be implemented.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330 in the depicted example. Typical PCI local bus implementations support three or four PCI expansion slots or add-in connectors.

In the present example, an operating system runs on processor 302 and is used to coordinate and provide control of various components within data processing system 300 in FIG. 3. The operating system may be a commercially available operating system, such as OS/2, which is available from International Business Machines. Corporation. "OS/2" is a trademark of International Business Machines Corporation. An object oriented programming system such as Java may run in conjunction with the operating system and provides calls to the operating system from Java™ programs or applications executing on data processing system 300. Java Text Markup Language (JTML) is an HTML-like language which enables users to use Java with the ease of using HTML for creating web pages. JTML is an integrated package of tools for the development of Java applets and user interfaces. It allows almost anyone with a need for online communication to create state-of-the-art applets without understanding Java programming concepts. JTML allows administrators to set up personal user accounts for authorizing users and to set up routines for automatically recording transactions between a JTML server and individual users. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

Figure 4:
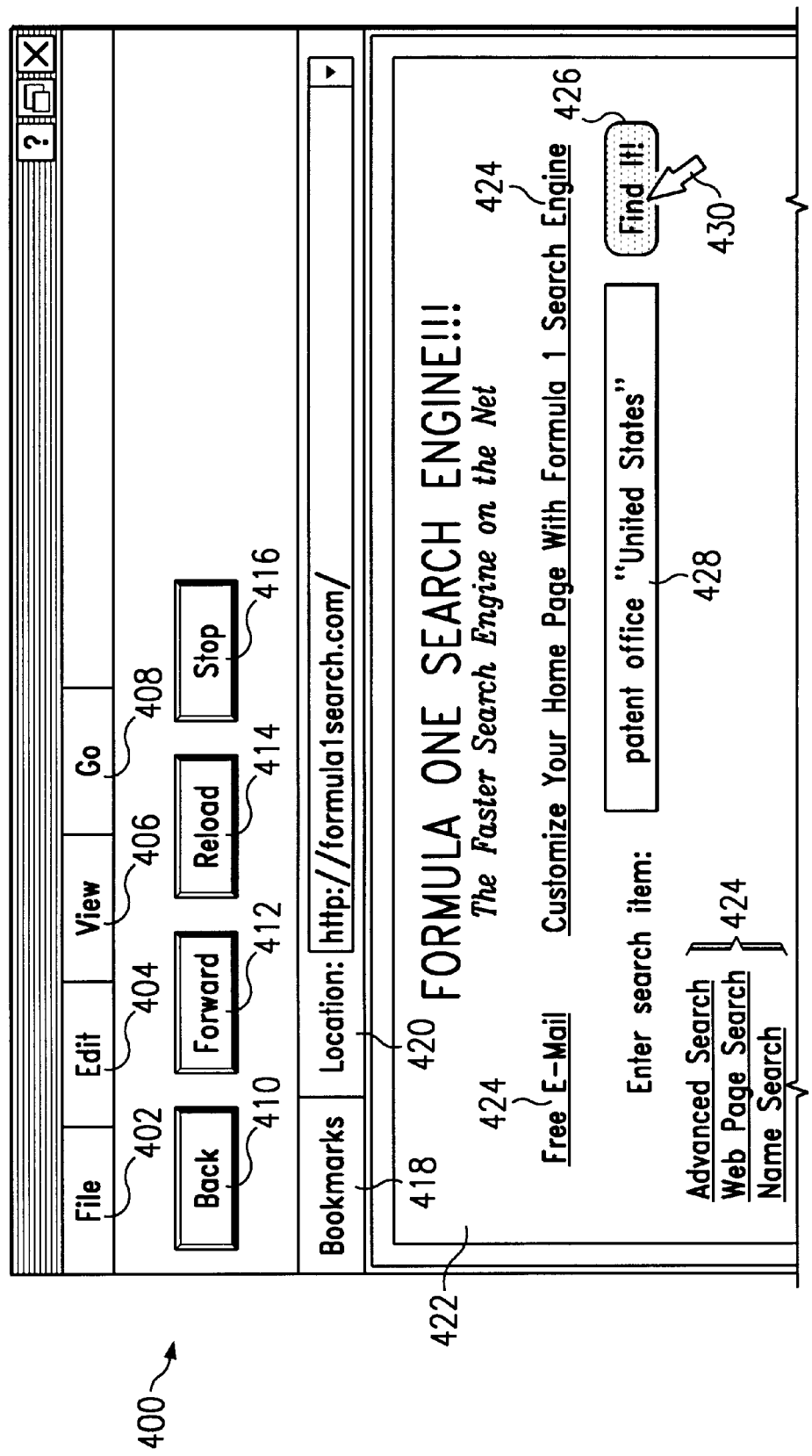
FIG. 4 illustrates a graphical user interface of a conventional browser.

FIG. 4 illustrates a graphical user interface of a conventional browser. Browser 400 may be used for implementing a preferred embodiment of the present invention. Browser 400 is an application that includes a graphical user interface, which allows a user to easily navigate through a node network, such as the World-Wide Web. Essentially, browser 400 is a multi-function graphical user interface; but one of its most important functions is accessing web pages of a prescribed format, such as hypertext transfer protocol (HTTP). The graphical user interface of browser 400 consists of a number of menus, buttons, and text fields. Only the more important features of browser 400 are illustrated in this example. It is well known in the art that browsers consist of and are configured with many other features not shown in this example. Buttons 402–406 are standard menu buttons on most application interfaces. By pressing file button 402, the user exposes a pull-down menu, which may include such features as open page capabilities, saving, routing, printing, and closing functions. Edit button 404 allows the user access to the browser's editing features, such as cut, paste and copy operations, find operations, and searching operations. Pressing edit button 404 also normally exposes a preference option, which allows the user to select certain preferences or options associated with browser 400. View button 406 allows the user to configure the graphical user interface of the browser, including hiding or viewing certain tool bars, navigators and buttons. Go button 408, when pressed by the user, exposes a menu of navigation tools, such as forward, back, or home. By pressing the go button and selecting one of these features, the user navigates through a series of web pages or nodes which have recently been visited, or a home or start-up site, which is normally defined by the user in the preference selection of the edit button. Buttons 410–416 are also navigation buttons. In fact, the functions of button 410 and button 412 are normally found in the go button 408 menu. Reload button 414 allows the user to reload the currently viewed page, in case of an error in loading or for a page which is constantly being updated by the source and yet provides no automatic updating feature to the browser. Stop button 416 ends the loading process of the current web page with whatever portion of the page that has been loaded up to the time stop button 416 is initiated. Bookmarks button 418, when pressed by the user, exposes the bookmarks and edit tools needed to save and maintain a list of favorite web pages or network nodes identified by the user. Finally, location text field 412 allows the user to manually identify a web page by its unique address, allowing the browser to access the address identified in the text. The present invention discloses a means for implementing direct linked selection of cached, previously visited links in nested web pages. As a user visits a web page, such as Formula One Search Engine page 422, in the conventional manner, the user has available numerous hypertext links embedded on the web page from which to choose. Links 424 illustrate hypertext links which were created by the web page creator. The user can quickly navigate to the web pages associated with hypertext links 424 by merely clicking on hot spots associated with the hypertext links with pointer 430. Browser 400 then automatically navigates to the address of the web page associated with the hypertext link.

In the example in FIG. 400, however, the user entered a text string in search text entry field 428, rather than either jumping to another web page or manually addressing the web page in location entry field 420.

Figure 5:
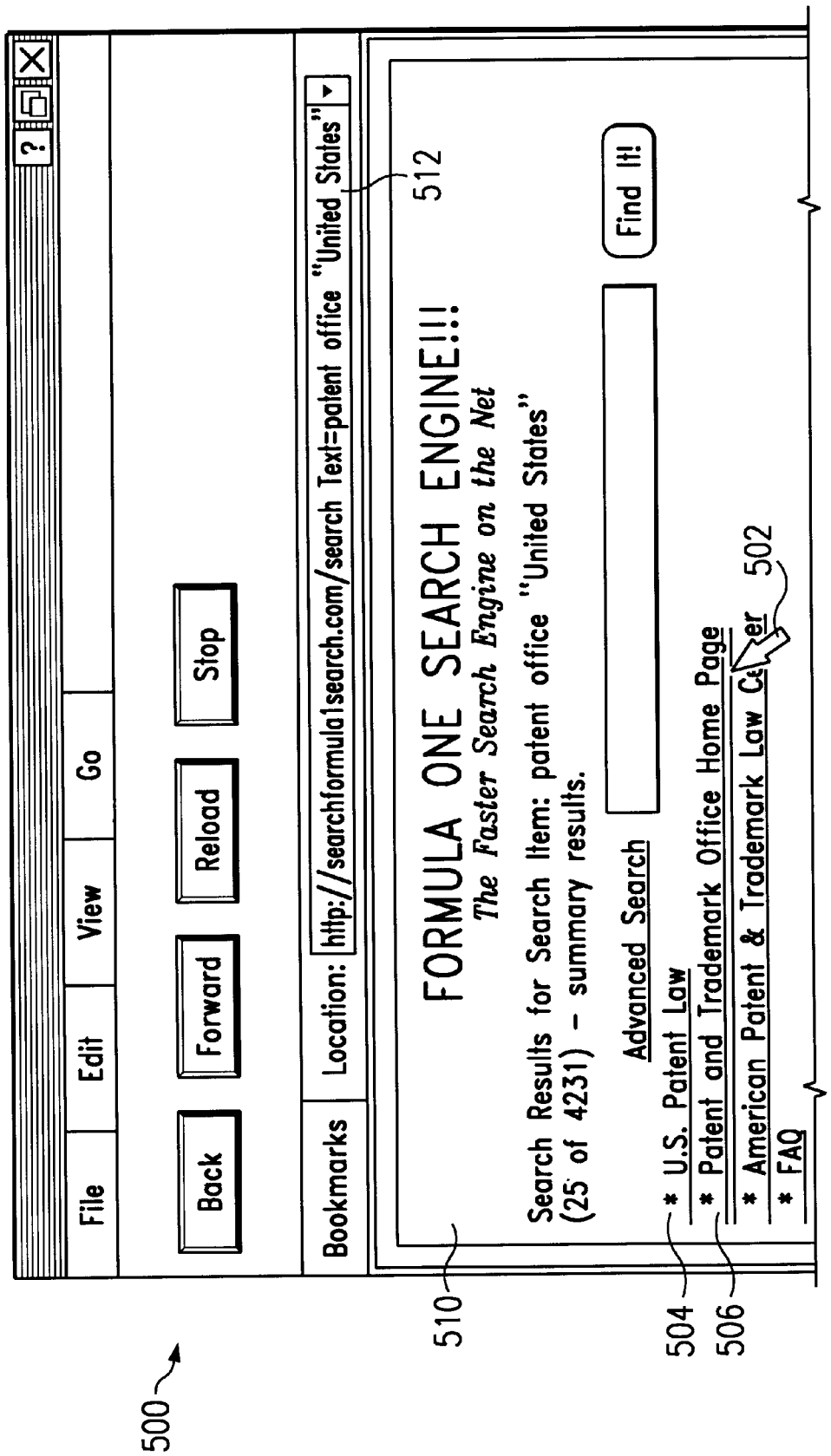
FIG. 5 illustrates a typical web page that might be expected as a result of the searching operation performed in FIG. 4.

FIG. 5 illustrates a typical web page that might be expected as a search result from the searching operation performed in FIG. 4. Web page 510 depicts the Formula One Search Engine Results page, which displays the search results obtained from the search request performed by the user in FIG. 4. Web page 510 also contains embedded hypertext links, as described above. In this case, U.S. Patent Law link 504 provides a hypertext link for the user to immediately access information about U.S. patent law. The next link, Patent and Trademark Office Home Page link 506 provides a means for the user to immediately access the U.S. Patent and Trademark Office home page. In this case, the user has manipulated pointer 502 over link 506 and activated the link. Activating a hypertext link usually entails clicking the mouse button or an entry command. Note that link 506 differs in appearance from link 504 in that the characters of link 506 are bolder and the underlining of the characters in link 506 is double rather than single. Conventionally, a user is directed to links on a web page by the color or font characteristics of the characters in the text of the link. Typically, hypertext links in a web page are displayed in a predetermined color shade that is different from normal text and indicates an active but unused hypertext link. After activation, or after the link has been accessed once, the color shade of the link changes to a second color, indicating to the user that the web page associated with the link has been selected or opened at least once. Thus, the user is provided an easy means to identify hypertext links on a web page and also discriminate links that have been used from those that have not been used.

Note also on browser 500 that location field entry 512 displays the address of web page 510. In the example depicted in FIG. 5, the user has positioned pointer 502 over link 506, which provides a link to the Patent and Trademark Office home page. By executing an enter command (clicking the pointer) with pointer 502 positioned over link 506, browser 500 will jump or open the page identified by the link.

Figure 6:
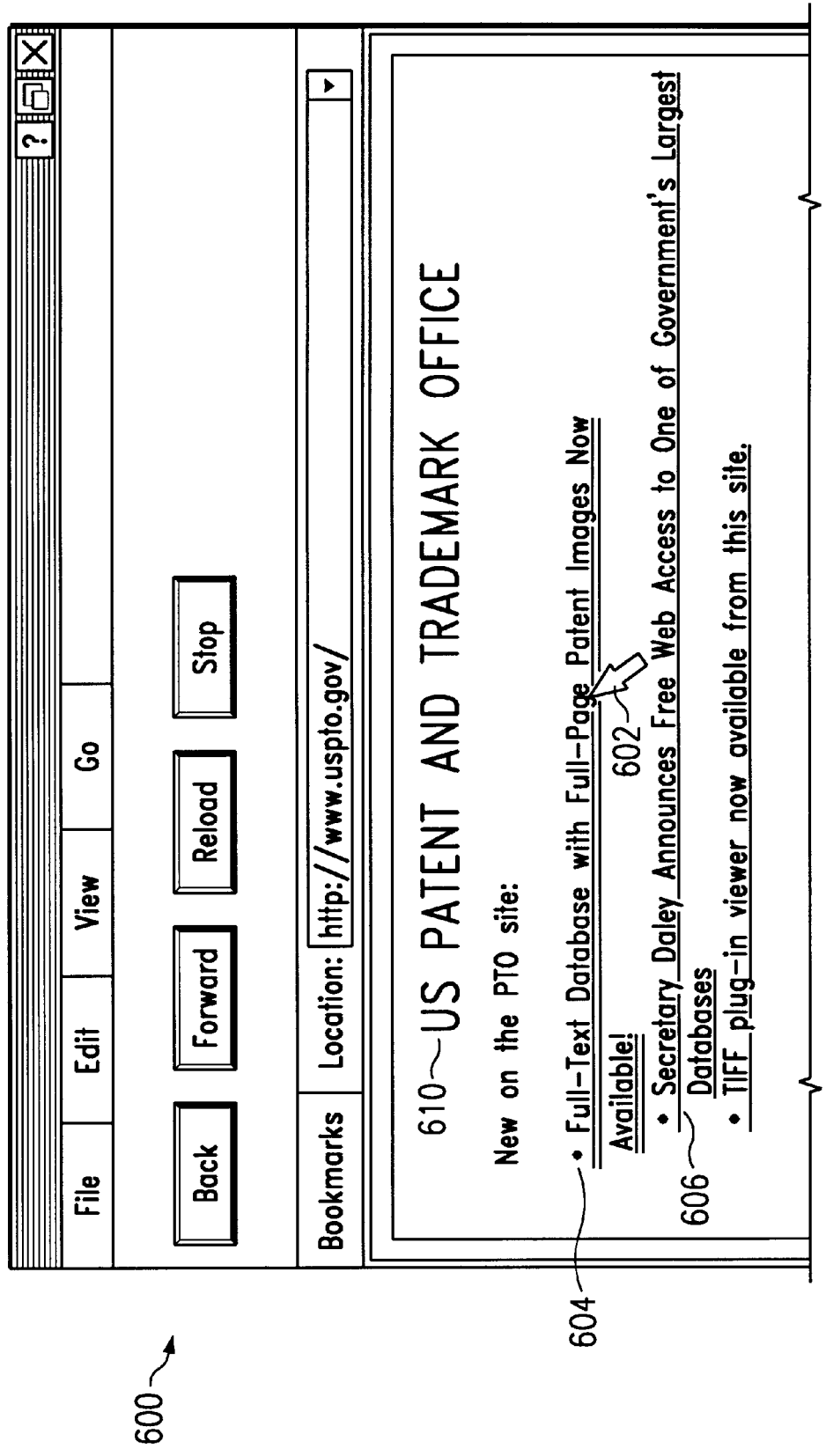
FIG. 6 illustrates the results of jumping to the Patent and Trademark Office home page.

FIG. 6 illustrates the results of jumping to the Patent and Trademark Office home page. Browser 600 has opened U.S. Patent and Trademark Office home page 610. In the depicted example, browser 600 displays web page 610 in response to the user executing a jump from the previous web page by merely clicking on the hypertext link identifying web page 610. Similar to the previous pages, web page 610 contains embedded hypertext links, such as links 604 and 606, interspersed with the text and graphics of the web page. Again, the user can easily identify hypertext links or hot spots contained in a web page by either color or font characteristics, such as different font types or underlining. In the present example, the user has positioned pointer 602 over link 604. In response, the character of the text in link 604 has changed to a bolder and double-underlined character, indicating that the hot spot associated with link 604 has been activated by pointer 602. Here, the user intends to jump from the U.S. Patent and Trademark Office home page, located at the address listed in location entry field 608, to the Full Text Database with Full Page Patent Image Now Available page associated with link 604.

Figure 7:
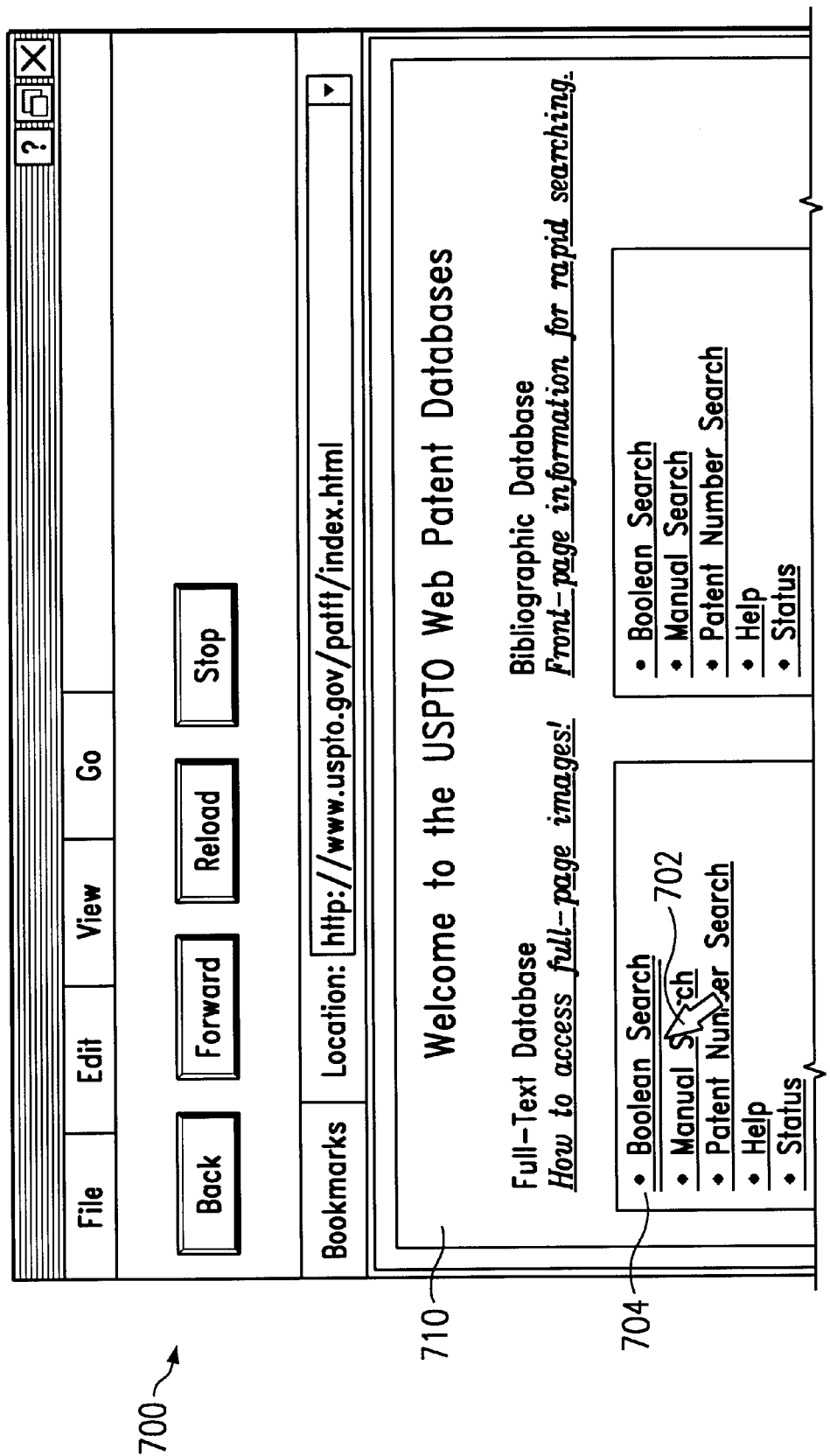
FIG. 7 illustrates the results of jumping from the previous web page to the U.S. Patent and Trademark Office Full Text Database page.

FIG. 7 illustrates the results of jumping from the previous web page to the U.S. Patent and Trademark Office Full Text Database page. Browser 700 displays web page 710, identified as The U.S. Patent and Trademark Office Database page. Here, the user continues to navigate through web pages by jumping from one page to another using hypertext links embedded on each page. In FIG. 7, the user has positioned pointer 702 over link 704.

Figure 8:
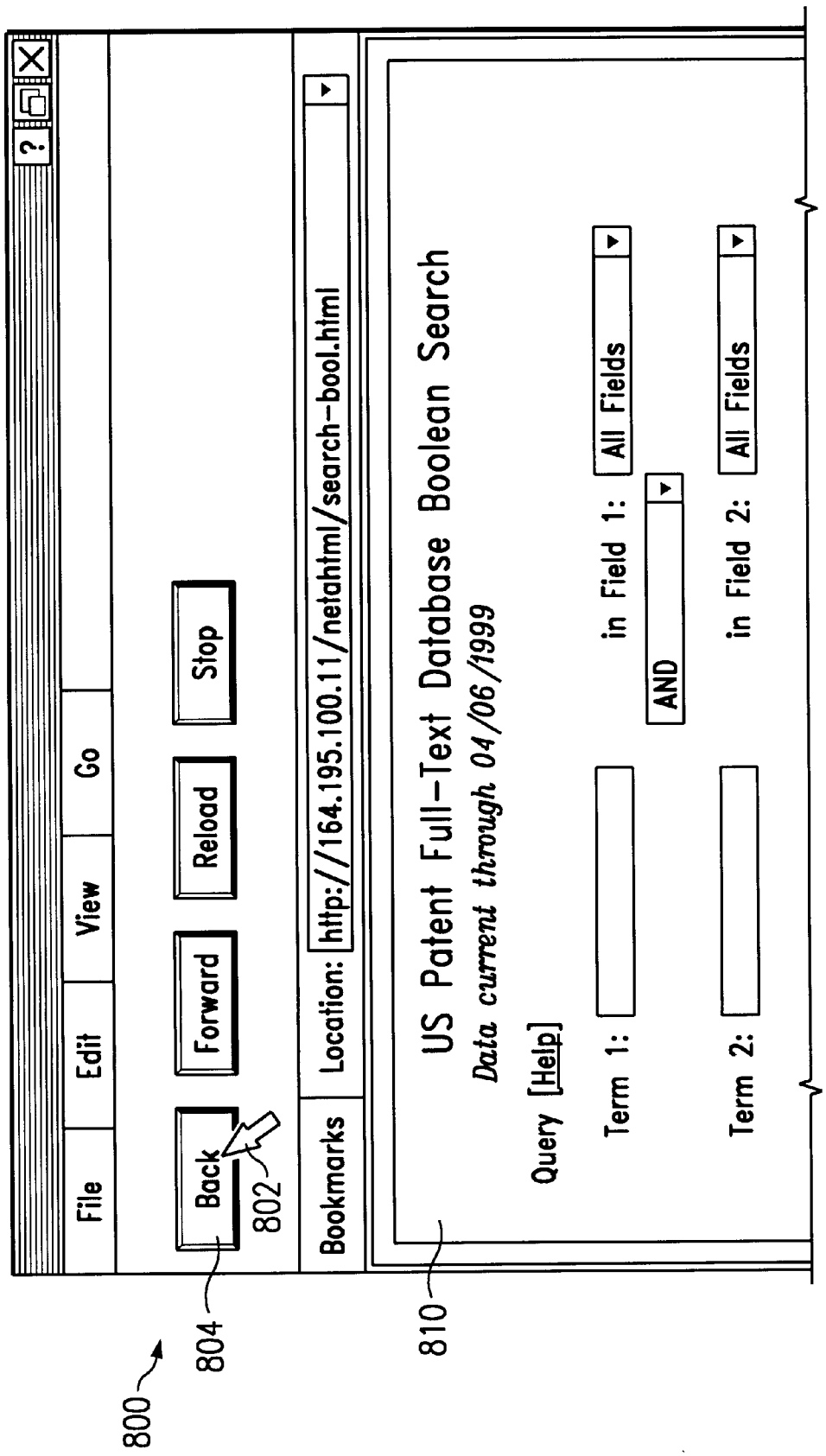
FIG. 8 illustrates browser 800.

FIG. 8 illustrates browser 800, which has opened web page 810 in response to the user clicking link 704 on FIG. 7. Web page 810 depicts the U.S. Patent Full Text Database Boolean Search page, which is linked to the previous web page by a hypertext link embedded in that page. It has been opened in response to the user's action on that link. In the present example, the user positioned pointer 802 over one of the navigation buttons—in this case, back button 804. As can be seen from the highlighted state of back button 804, the user has selected the back button. In response to activating the back button, browser 800 navigates back to the last page displayed.

Figure 9:
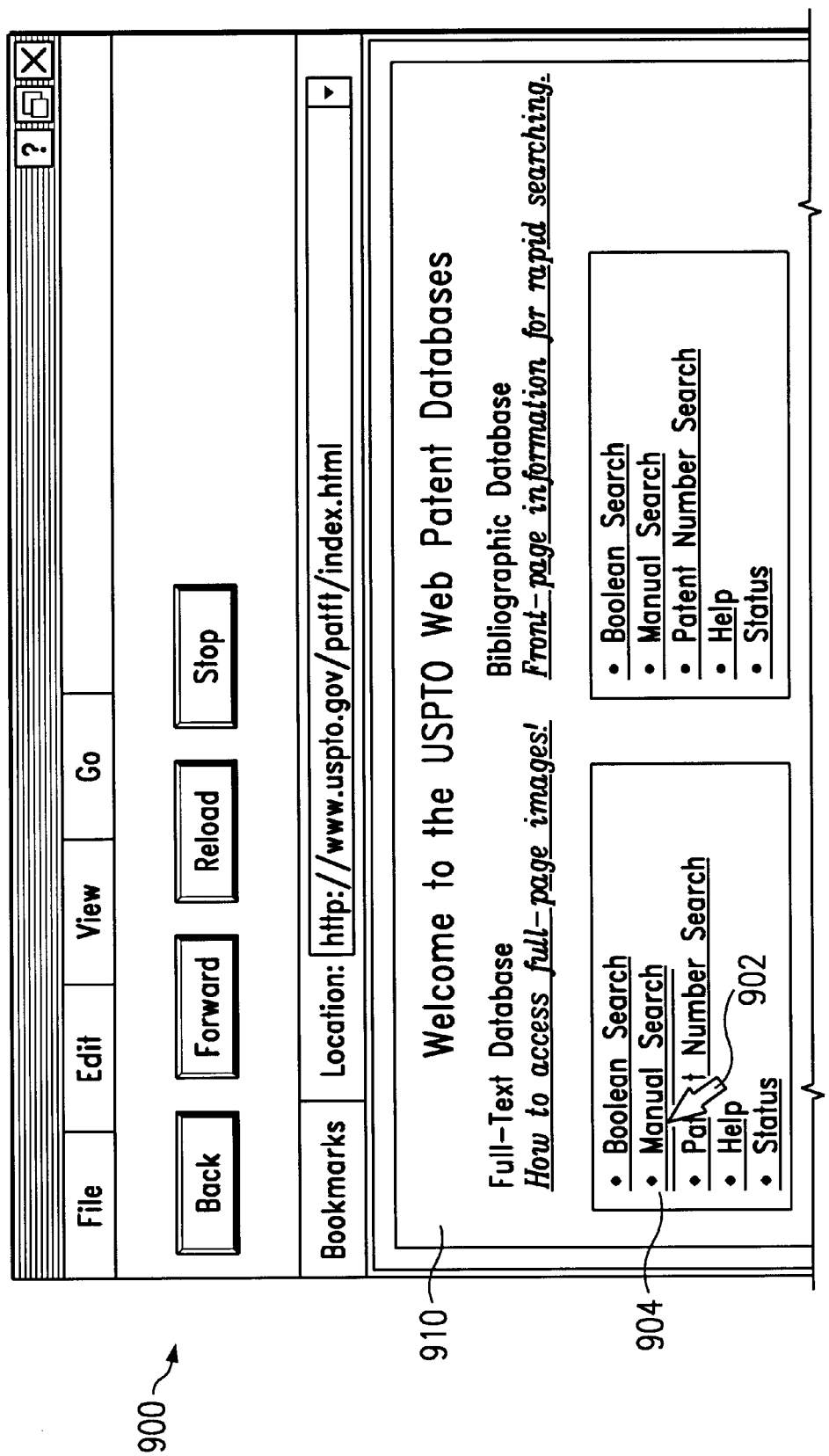
FIG. 9 illustrates browser 900, which has opened web page 910 in response to the user's action on the previous web page.

FIG. 9 illustrates browser 900, which has opened web page 910 in response to the user's action on the previous web page. In response to the user positioning the cursor over the back navigation button, the Welcome to the U.S. PTO Web Patent Databases page has been re-opened. In the present example, the user has positioned cursor 902 over link 904. In this case, link 904 is the Manual Search Page of The U.S. Patent and Trademark Office. Note that link 904 is highlighted, indicating that the user has executed the jump to the manual search page.

Figure 10:
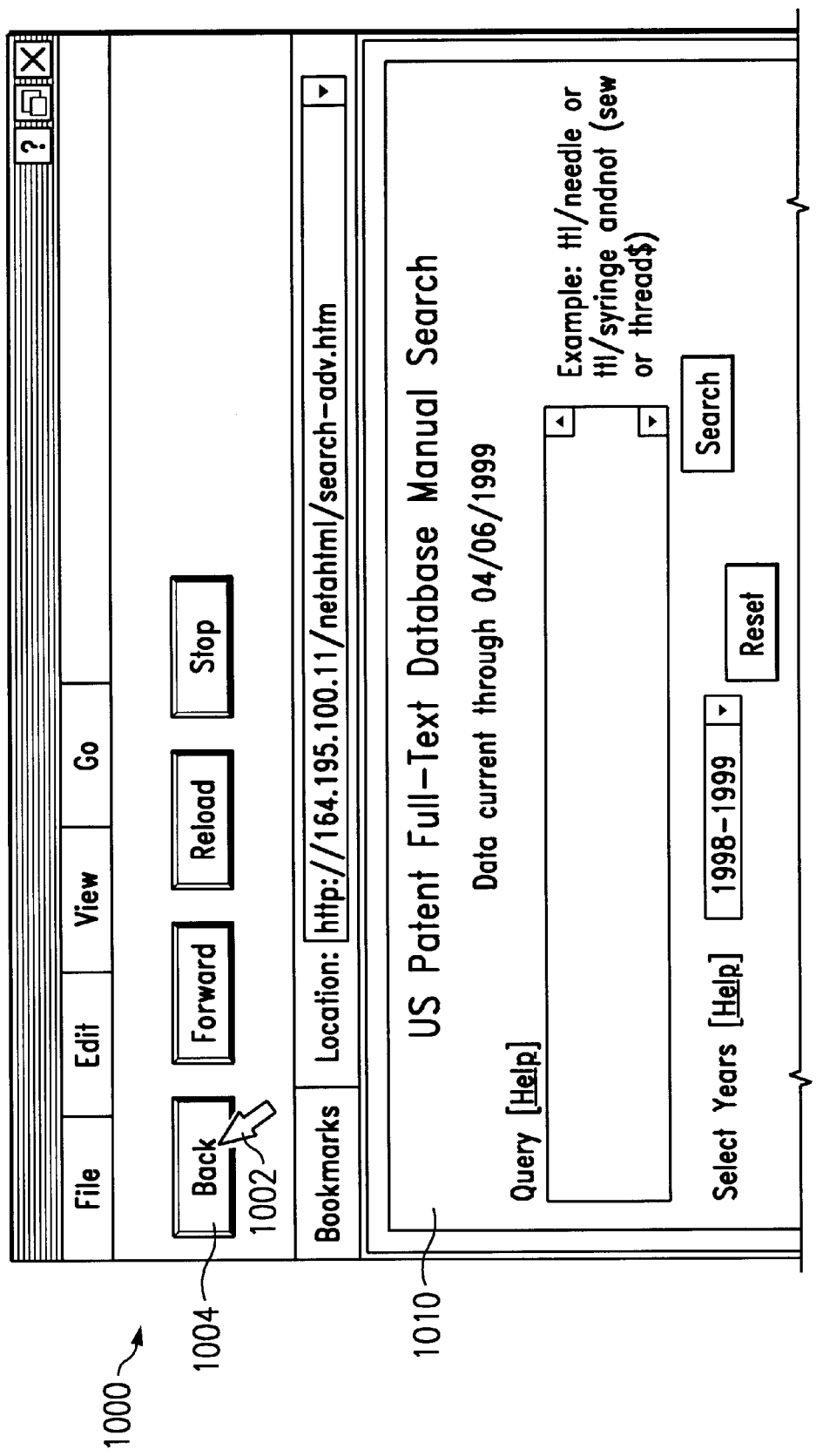
FIG. 10 illustrates browser 1000, which displays web page 1010 as a result of the user's action on the previous page.

FIG. 10 illustrates browser 1000, which displays web page 1010 as a result of the user's action on the previous page. In this case, the user has selected a link which is actually an embedded hypertext link to U.S. Patent Full Text Database Manual Search page, as depicted by link 902 in FIG. 9. In the present example, the user has positioned cursor 1002 over navigation back button 1004. Note the highlighted state of the back button, indicating that the user has executed the command to navigate back to the previous page. By activating back button 1004, the browser re-opens the previous web page by a back function provided by browser 1000.

Figure 11:
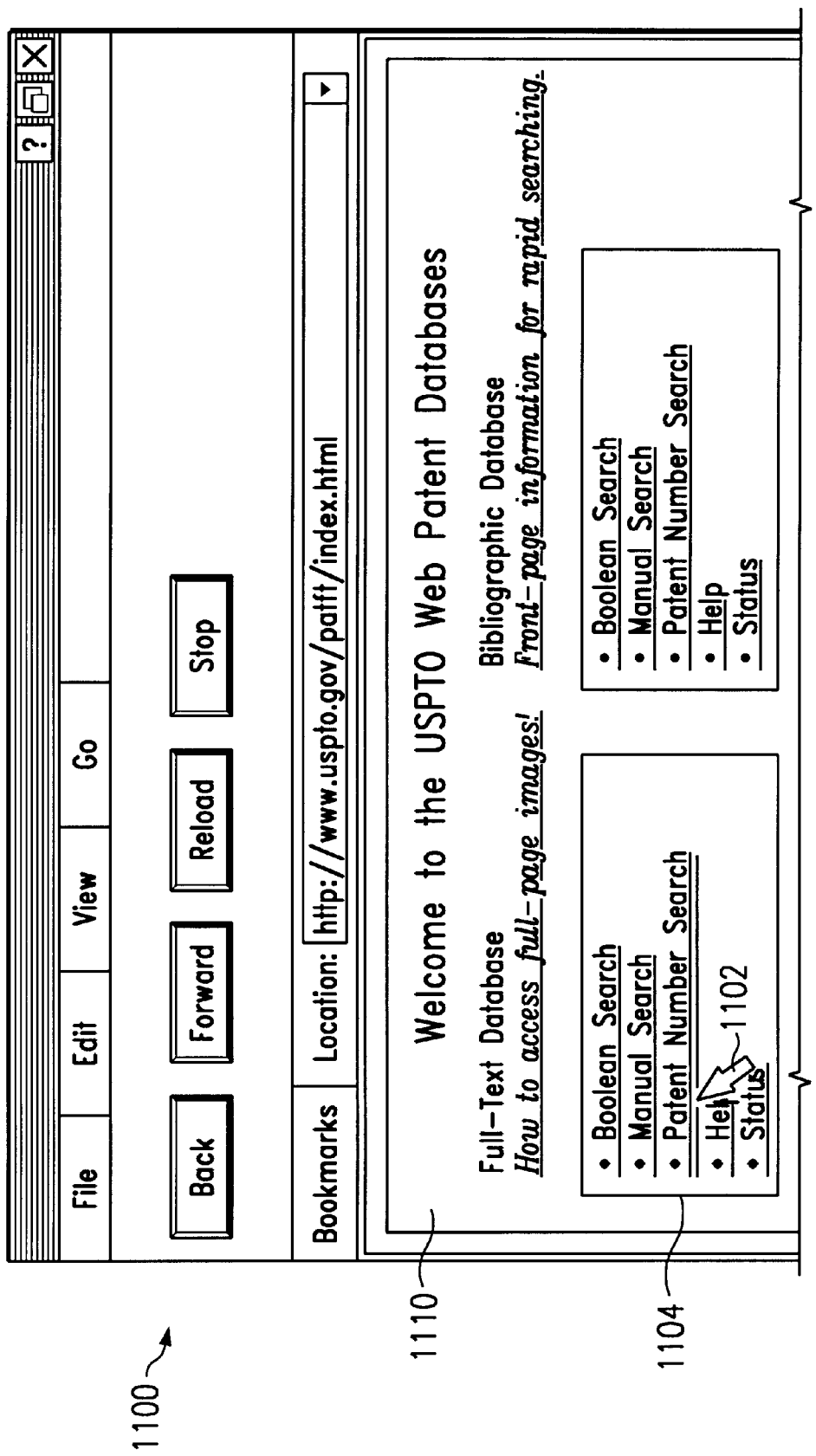
FIG. 11 illustrates browser 1100, which depicts the results of executing the "Back" navigation command on the previously visited web page.

FIG. 11 illustrates browser 1100, which depicts the navigation results of the user executing the back navigation command on the previously visited web page. In the depicted example, the user has browser-navigated back to the Welcome to the U.S. PTO Web Page Databases page, as depicted by page 1110. Also, the user has now positioned pointer 1102 over link 1104. As can be seen from the example, link 1104 is in a highlighted state, indicating that the user has executed the link to the patent number search page.

Figure 12:
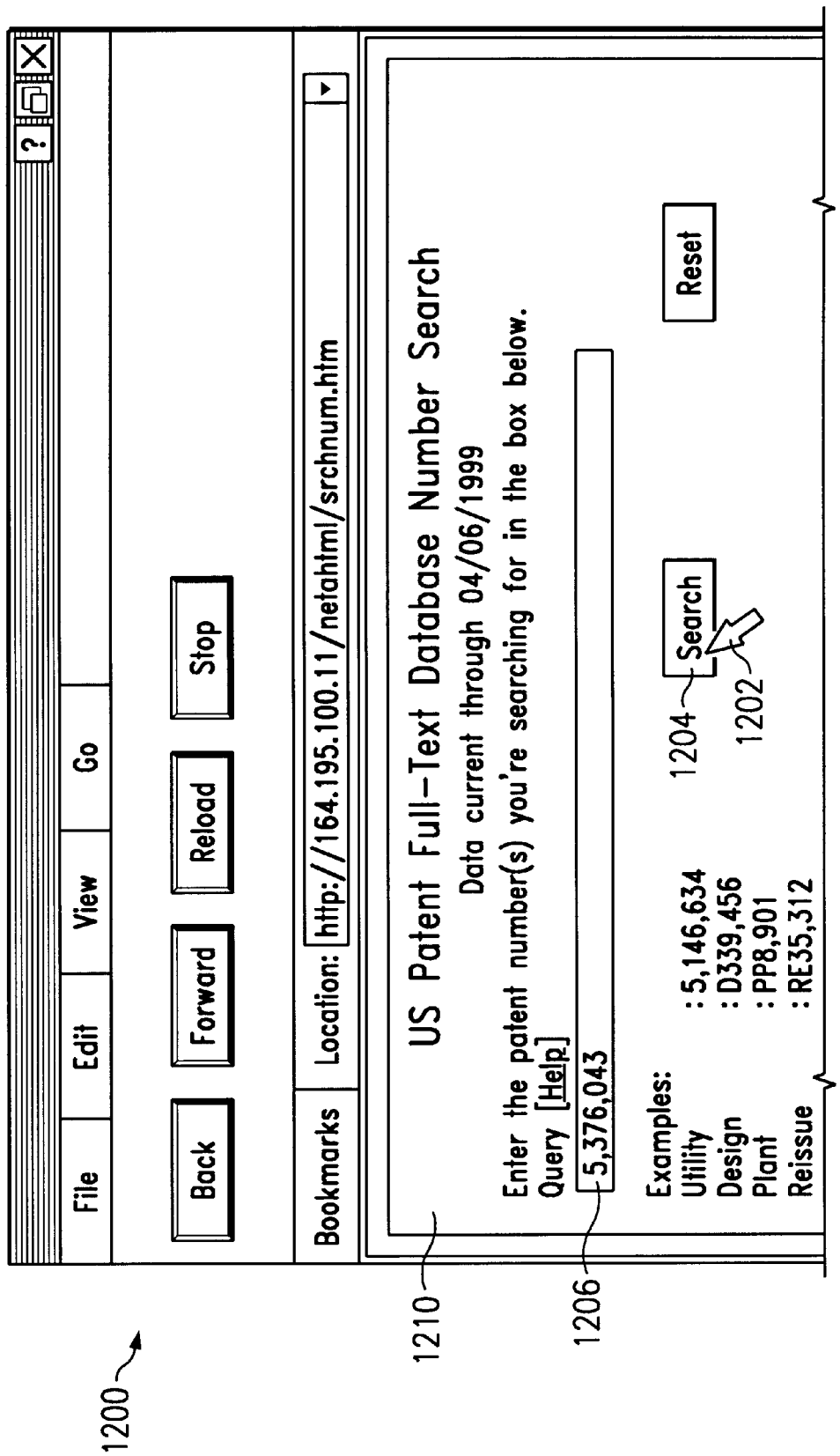
FIG. 12 illustrates browser 1200, specifically the browser's response to the action taken by the user in the previous page.

FIG. 12 illustrates browser 1200, showing the browser's response to the action taken by the user in the previous page. In this case, the browser has opened the U.S. Patent Full Text Database Number Search page—web page 1210. Also, note that the user has positioned cursor 1202 over search radio button 1204. Previously, the user entered a query term, in this case '5,367,043', in text field 1206. Here, the user intends to perform a search operation on page 1210 by entering a search term in text field 1206 and executing the search command by actuating search radio button 1204. The search operation depicted in FIG. 12 is similar to that depicted on FIG. 4 in that the user has requested additional data be provided by querying the search page.

Figure 13:
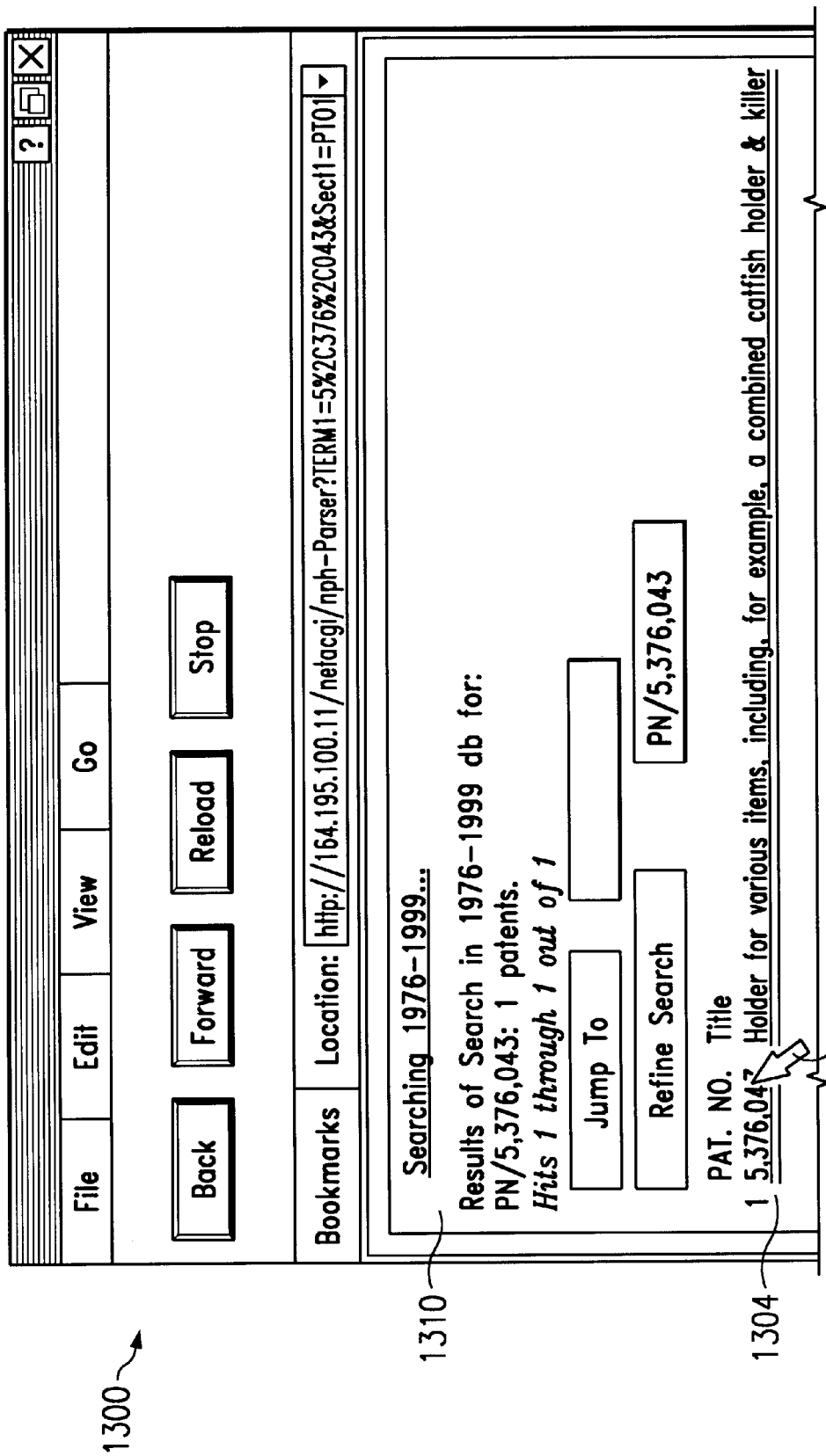
FIG. 13 illustrates browser 1300, showing the results of the query made in FIG. 12.

FIG. 13 illustrates browser 1300, which depicts the results of the query made in FIG. 12. In the depicted example, browser 1300 returns web page 1310 in response to the user's query illustrated in FIG. 12. A web page 1310 depicts the results found in the U.S. Patent Full Text Database, based on the query term input by the user. Web page 1300 indicates that one patent number was returned as a result of the user's search. In the depicted example, patent number 5,637,043 is displayed on page 1310 as link 1304. Note that the user has positioned pointer 1302 over link 1304, and link 1304 exhibits a highlighted state, indicating that the link has been selected by the user. Here, the user intends to use link 1304 to jump to the web page associated with link 1304.

FIG. 14 illustrates browser 1400, depicting the results of the user's action on web page 1310. In the depicted example, browser 1400 has opened web page 1410 as result of the user's action on web page 1300 of FIG. 13. Here, U.S. Pat. No. 5,376,043 has been opened in response to the user actuating a hypertext link embedded in the previous web page, which addresses the page 1410. As the user navigates from page to page, the browser application is accumulating a history file, which contains the web page identifier addresses and the times that the user visited each page.

FIG. 15 illustrates history table 1500, which depicts the tabular listing of the previously visited web page data. Note that table 1500 contains a title column 1502, a location column 1504, a first visit column 1506, last visit column 1508, and expiration column 1510. Each time a user visits a web page, the browser automatically extracts the title information, location information, and the time of the visit and inputs that information in a cache. After a request by the user, the browser tabulates the information into history table 1500. In the present example, the titles of the web pages are listed in column 1502, which generally follows the navigation path illustrated in FIGS. 4 through 13. Entry 1512 on table 1500 indicates that the first web page visited was Formula One Search Engine page. Entry 1504 shows that the next web page visited was the Formula One Search Results page. The third page in the browsing sequence was Patent and Trademark Office home page, illustrated in table 1500 by entry 1516. The fourth page visited was the Database Patent Full Text and Bibliographic page (entry 1518). From there, the user browser navigated to the U.S. Patent Full Text Database Search page, as indicated by entry 1520 in table 1500. Next, entry 1522 shows the next page in the column to be the U.S. Patent Full Text Database Manual Search.

Returning to FIGS. 8, 9 and 10, the user navigation path progresses from the U.S. Full Text Database Search page back to the Database Patent Full Text and Bibliographic page, and then proceeds to the U.S. Patent Full Text Database Manual Search page. In contradiction to the illustrations of FIGS. 8–10, history table 1500 progresses immediately from the U.S. Patent Full Text Database Search page to the U.S. Patent Full Text Database Manual page without indicating that the user navigated through The Database Full Text and Bibliographic page. This apparent error in history table 1500 is due to the entry method in which the browser enters new web page information to the memory cache. Rather than re-entering all of the data concerning each web page each time the page is visited, the conventional browser normally updates the last visit time to the web page rather than re-enter the data with a new time stamp. This is clearly evident from entry 1530, which indicates that the last visit to the Database Full Text.and. Bibliographic page was accessed after the user navigated to the U.S. Patent Full Text Search page and the U.S. Patent Full Text Database Manual Search page. Thus, it is clear from the history of table 1500 that a user cannot establish an accurate picture of the navigation path from a conventional history table. This is primarily due to the fact that the browser updates the web page identifiers stored in cache rather than re-writing all new information related to the identifiers in cache each time a web page is opened. Thus, a user using a conventional history table, such as that depicted in history table 1500, can never fully recover a previous navigation path.

Column 1502 contains three more entries. The U.S. Patent Full Text Database Number Search entry 1524, the U.S. Patent Database Search Results PN/5376043 entry 1526, and the U.S. Pat. No. 5,375,043 entry 1528.

In a preferred embodiment of the present invention, web page information accessed by a conventional browser is stored in the cache in such a manner as to allow for the recreation.of a navigational path executed by the user. Furthermore, the present invention allows for a user to navigate both forward and backward along the path by using that information. However, the present invention provides a graphical user interface which is more sophisticated than a standard history table. The history table of the present invention not only provides a tabular listing of the web pages accessed by the user, but also it is expandable to show navigational paths associated with any entry within the history table. Thus, by merely identifying the title of a web page identifier displayed in the history table, the user can expand that identifier to show other web pages visited from the identified web page during a previous navigation.

Figure 16:
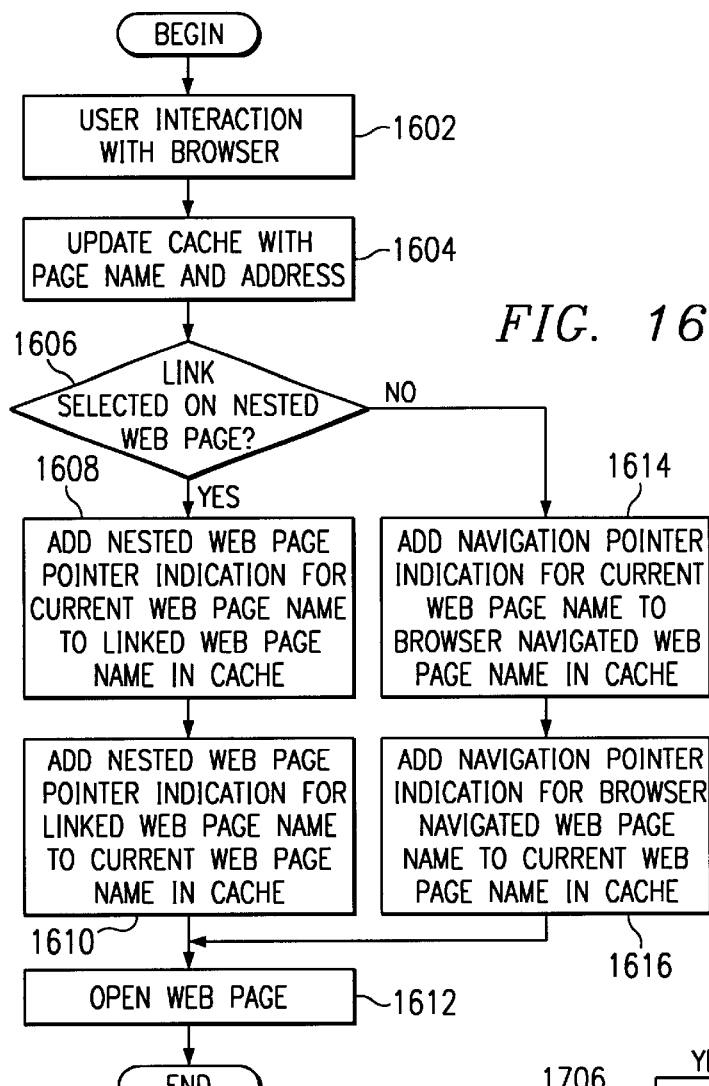
FIG. 16 illustrates the process of storing data associated with a link web page in accordance with the preferred embodiment of the present invention.

FIG. 16 illustrates the process of storing data associated with a link web page in accordance with a preferred embodiment of the present invention. The process begins when the user interacts with the browser (step 1602). In the depicted process, user interaction may include activating a hypertext link on a web page, thereby jumping from the current web page to a web page identified by the hypertext link. Other interactions might include executing a search string on a web page. In either of these two examples, the browser executes an application or applet loaded from the web page in response to user interaction. A third user interaction is performed within the browser itself, such as a forward navigation command or a backward navigation command using the browser functional. In the second case, the browser creates a path to a web page without regard to the contents of the current web page.

Once the web page is open, the browser updates cache with a page identifier and page address (step 1604). Next, the browser ascertains whether a link was selected from a hypertext link on the previous, nested web page (step 1606). If a hypertext link was executed on the previous web page, the browser adds a nested web page pointer indication to the current web page identifier, pointing to the linked web page (step 1610). Additionally, the browser adds a nested web page pointer indication for the current web page identifier to the identifier of the linked web page stored in cache (step 1610). Thus, along with the typical information depicted in history table 1500, the present invention also stores pointers to and from previously linked web pages. This enables the user to navigate from one linked web page to the next without regard for the position of either web page in the conventional history table.

Alternatively, if user interaction does not involve a link on the web page, the process flows to step 1614. There, the browser adds a navigation pointer indication for the current web page name (rather than a nested web page pointer indication as described above) to the browser-navigated web page identifier in cache. Similarly, the browser then adds a navigation pointer indication for the browser-navigated web page name to the current web page name stored in cache (step 1616). The pointers form an association between the two web pages in cache. After the browser has input the association information in cache, the browser then opens the designated web page (step 1612). The process then ends.

As described above, in a preferred embodiment of the present invention, the browser adds important navigation path information to the web page identity information stored in cache. Thus, as the web page identity information is retrieved from cache, the pointers stored with the web page identifier are likewise retrieved, allowing the user to recreate a previously executed navigation path at any point in time after its creation.

Figure 17:
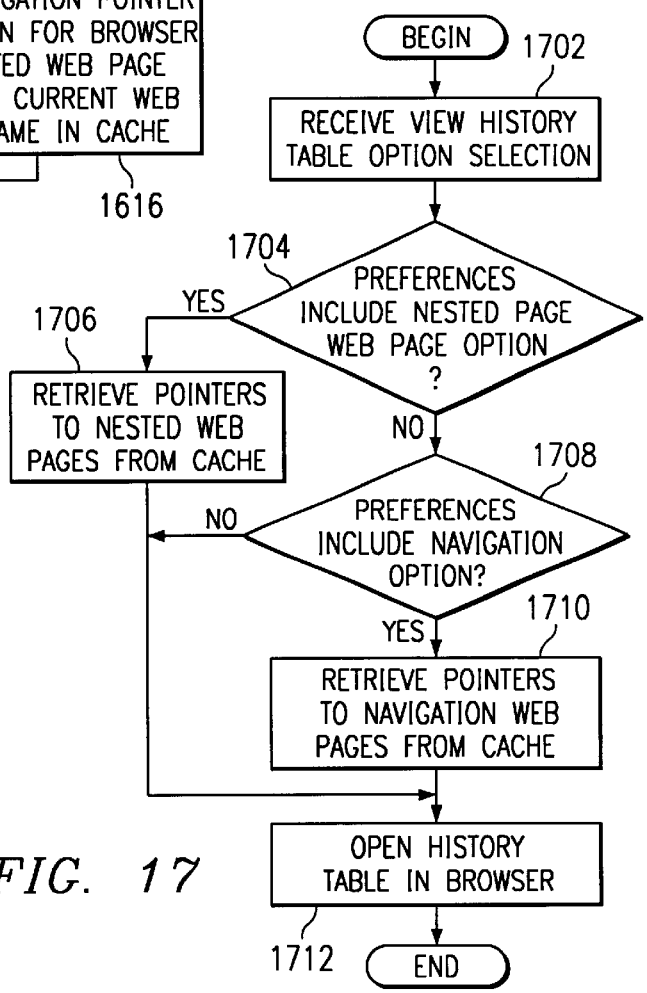
FIG. 17 illustrates a process in accordance with the preferred embodiment of the present invention for opening a history table which includes pointers to nested web pages or navigation web pages.

FIG. 17 illustrates a process in accordance with a preferred embodiment of the present invention for opening a history table, which includes pointers to nested web pages or navigation web pages. The process starts with the browser receiving a view command for viewing the history table from the option selection (step 1702). A check is made to determine if the preferences include nested web page options (step 1704). In a preferred embodiment of the present invention, a history table includes pointers to direct link selections or cache previously visited links in nested web pages. Each time a web page is visited, the web page identifier and its address are cached, as is the convention; however, associated with a web page identifier are pointers to other web pages visited before or after the initial web page. Still other information is provided in the cache that identifies the jump between pages as a product of a direct link between the pages via an embedded hypertext link.

In an alternative embodiment of the present invention, the user may navigate from a first page to the next using the navigation tools provided on the browser. In that embodiment, the web page identifier and address of the first web page are stored in cache, along with the identity of any web page browser-navigated to from the H first web page, similar to the previous embodiment.

However, contrasting the previous embodiment, information is added to the cache specifying that the jump between pages was a product of the browser navigation tools rather than embedded hypertext links in the web pages. Thus, using preferred embodiments of the present invention, the user can reconstruct separate navigational paths through web pages that were precipitated by either embedded hypertext links on web A pages or browsing using the navigation tools provided by the browser. The two embodiments of the present invention provide the user with an important tool for backtracking a navigational path to a specific site that was never bookmarked or identified at the time it was visited.

Returning to step 1704, if the preferences include nested web page options, that is, jumping between pages was a product of hypertext links in one of the web pages, the browser may retrieve the pointers to the nested web pages from cache (step 1706). The browser then opens the history table in the browser view area for display to the user (step 1712). The history table includes indicia associated with each web page identifier, which indicates pointers to nested web pages that are linked to that identifier.

Turning to step 1704, assuming the preferences do not include a web page option, the browser then checks that the preferences include a navigation option (step 1708). If the user has not designated either navigation or nested web page options, the browser then opens the history table in the browser view area without any direct link information. The history table there appears similar to the conventional history tables, such as history table 1500 in FIG. 15. If, at step 1708, the user has previously selected preferences including navigational options, the browser retrieves those pointers to navigational web pages from cache (step 1710). The browser provides indicia associated with each web page identifier, which identifies the web page entry in the table as having linked web page information created by navigation using the tools provided in the browser. The browser then opens the history table in the browser view area, which includes that.indicia (step 1712), and the process ends.

At the time the user initially opens a history table, such as history table 1500 shown in FIG. 15, the history table of the preferred embodiment looks similar to a conventional history table. However, the table will include indicia or iconic information related to previously visited, linked or browser-navigated web pages associated with web page identifiers displayed in the entries of the history table. Thus, any web page identifier in a field of the history table which does not contain such indicia has not been jumped to or from using embedded hypertext links. Conversely, if a web page identifier in a text field of the history table in the preferred embodiment of the present invention contains such an iconic identifier, the user would conclude that that page was jumped to or from using an embedded hypertext link. Once a user has displayed the history table in a normal manner, the user may expand any web page path by merely clicking on the icons associated with the web page identifiers.

Figure 18:
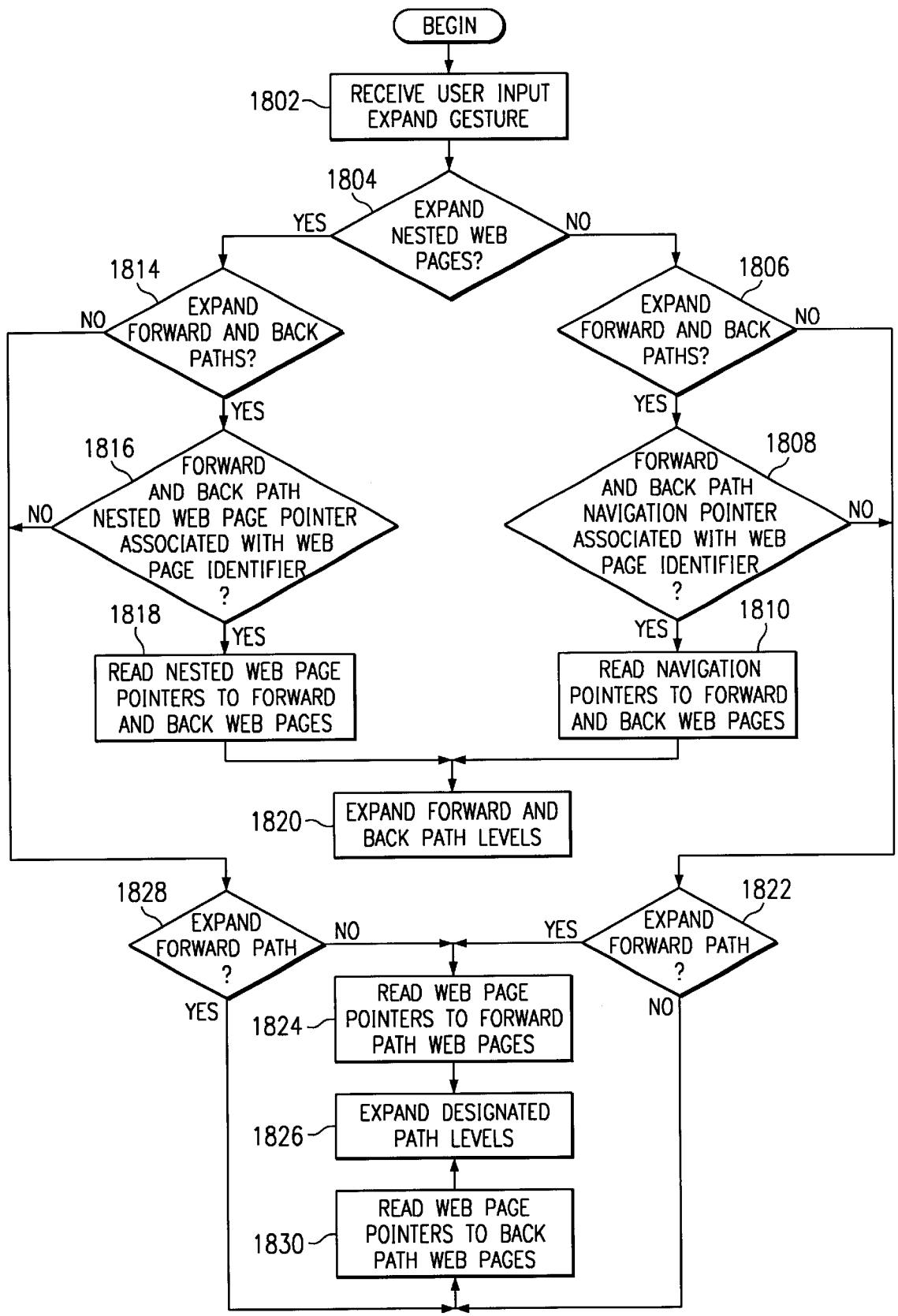
FIG. 18 illustrates a process in accordance with the preferred embodiment of the present invention for expanding a path from a text field in a history table.

FIG. 18 illustrates a process in accordance with the preferred embodiment of the present invention for expanding a path from a text field in a history table. The process begins when the browser receives a user input expand gesture (step 1802). The browser must then determine whether to expand nested web pages or web pages that were previously visited using the browser tools (step 1804). If it is determined to expand nested web pages, the browser checks to see if the user intends to expand forward from the web page identified in the selected field text, or backward from the web page identified in the selected field text, or both. Thus, in a preferred embodiment of the present invention, each web page identifier may have three expansion symbols associated with the web page: an icon for expanding forward; an icon for expanding backward; and an icon for expanding both forward and backward.

The browser then checks for forward and back paths in nested web page pointers associated with the selected web page identifier (step 1814). Assuming the paths are available from cache, the browser reads the nested web page pointers to the forward and back web pages (step. 1818) and expands the forward and back path levels (step 1820). In some cases, the number of consecutive links can be quite large. Thus, as is the convention with normal menus, the browser only expands the number of web pages that can be easily viewed in the viewing area of the browser. The user then can navigate forward and back through the history table using a menu slider bar.

Returning to step 1814, if the user has not intended to expand forward and back, or if, at step 1816, forward and back nested web page pointing information is not available from the web page identifier, the process determines if the user intends to expand the forward path (step 1828). If the reader does intend to expand the forward path, the browser reads the nested web page pointers to the forward pages (step 1824) and expands the designated path level (step 1826). Returning to step 1828, if the user did not intend to expand forward, the browser reads the nested web page pointers to the back path pages (step 1830) and expands the designated path levels in the display of the history table (step 1826).

Returning to step 1804, the process is identical for the path created by using the navigation tools from the browser.

In step 1804, if the user intends to expand the navigational path created by the browser tools, the browser determines if the user intends to expand forward or back at step 1806. If the user intends to expand both forward and back paths, the browser checks that forward and back path navigation pointers associated with the web page identifier are available (step 1808). Assuming they are, the browser reads the navigation pointers to the forward and back web pages at step 1810 and displays expansions of forward and back path levels in the history table (step 1820). If it is not the user's intent to expand both forward and back at step 1806, or if both forward and back pointers are not available at step 1808, the process flows to step 1822, where the browser determines if the user intends to expand a forward path (step 1822). If so, the browser reads the web page pointers to the forward pages (step 1824) and expands the designated path levels (step 1826). Returning to step 1822, if the user does not intend to expand the forward path, the browser reads the web page pointers to the back pages (step 1830) and expands the designated path levels at step 1826.

FIG. 19 illustrates history table 1900, which includes an expanded path of web page identifiers in accordance with a preferred embodiment of the present invention. In the depicted example, the user has positioned pointer 1902 over the "expand all" icon on field entry 1904. In response, the browser has expanded the Patent and Trademark Office Home Page to expose forward and back history paths. Referring back to FIGS. 4–14, from the U.S. Patent and Trademark Office Home page, the user hypertext-linked to the Database Patent Full Text and Bibliography page depicted in field 1906. The user then used three separate hypertext links embedded in the Database Patent Full Text and Bibliography page, as depicted by fields 1912, 1914 and 1916, reflecting the jump to the U.S. Patent,Full Text Database and Search page, the jump to U.S. Patent Full Text Database Manual Search page, and the jump to U.S. Full Text Database Number Search page.

Field 1918 depicts the next level in the navigational path, where the user jumped to the U.S. Patent Database Search Results page. In jumping from the U.S. Patent Full Text Database Number Search page to the U.S. Patent Search Results page, the user did not use an embedded hypertext link. Instead, the page was automatically opened in response to the search result of the user's query. So, even though a hypertext link was not used to jump from one page to another, the search functionality provided in the U.S. Patent Full Text Database Number Search page caused the jump to the second page. In a preferred embodiment of the present invention, search and query result pages are treated in the same manner as hypertext links; thus, field 1918 is expanded to the next path level showing the search results page. This aspect allows the user to expand the navigation path table to include web pages that were of interest during navigating yet were not hypertext-linked to any page in the user's navigation path.

Finally, the user jumped to the U.S. Pat. No. 5,367,043 page using a hypertext link on the search results page, as depicted in entry 1920. Clearly, in using the expansion feature of the present invention, the user can provide a graphical illustration of the direct link navigation performed by the user. Each level in the path is clearly displayed, along with identifiers of each web page visited in that level. The back path from the Patent and Trademark Office Home page, entry 1904, is depicted as the Formula One Search Results page, entry 1902, which expands to the initial level that started the user navigation, that is, the Formula One Search page—entry 1924.

Thus, from any web page identifier stored in a history table which a user can identify as a site in a navigation, the user can expand to the entire navigation path by merely expanding the path links associated with that identified site.

It is important to note that, while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media such as floppy discs, hard disk drives, RAM, CD-ROMs, and transmission-type media, such as digital and analog communications links.

The description of the present invention has been presented for purposes of illustration and description but is not intended to be exhaustive or limited to the invention in the form disclosed. Many modifications and variations will be apparent to those of ordinary skill in the art. This embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing implemented method for creating a graphic representation of a navigation path of web page identifiers, the method comprising:

displaying a history table having at least a first entry for a first web page, wherein the first entry includes a graphic representation of a navigation path and at least one of a web page identifier, a location, a first visited time, a last visited time, and an expiration;

in response to accessing the graphic representation of a navigation path, expanding the navigation path containing at least a second web page identifier to form an expanded navigation path, wherein the first and second web page identifiers define a navigation path from the first web page to a second web page;

displaying the expanded navigation path; and in response to accessing the second web page identifier in the expanded navigation path, opening the second web page.

2. The method recited in claim 1, wherein the navigation path contains a third web page identifier and wherein the first, second, and third web page identifiers define a navigation path from the first web page to a third web page.

3. The method of claim 1, wherein the step of displaying the expanded navigation path includes displaying the expanded navigation path concurrently with the history table.

4. The method of claim 1, wherein the step of displaying the expanded navigation path includes superimposing the expanded navigation path over the history table.

5. A data processing implemented method for creating a graphic representation of a navigation path of web page identifiers, the method comprising:

initiating a session;

accessing a first web page;

caching a first web page identifier associated with the first web page;

activating a second web page from the first web page, wherein a second web page identifier is associated with the second web page and the second web page is activated from the first web page by selecting a control in the first web page;

caching storing, in association with the first web page identifier, a nested web page pointer to the second web page identifier, wherein the nested web page pointer defines a navigation path from a first web page to a second web page;

creating a graphic representation of the navigation path;

activating a previously visited web page from the second web page, wherein the previously visited web page is activated from the second web page by selecting a browser function; and storing, in association with the second web page identifier, a navigation web page pointer to a previously visited web page identifier associated with the previously visited web page.

6. The method recited in claim 5 further comprising:

accessing the second web page;

caching the second web page identifier associated with the second web page; and caching the first web page identifier in association with the second web page identifier.

7. The method recited in claim 6 further comprising:

ending the session;

initiating a new session; and retrieving the first web page identifier, wherein the nested web page pointer is also retrieved.

8. The method recited in claim 5 further comprising:

activating a third web page from the first web page, wherein a third web page identifier is associated with the third web page; and storing a third web page pointer in association with the first web page identifier, wherein the first web page is associated with the second web page and the third web page.

9. The method recited in claim 8 further comprising:

retrieving the first web page identifier, wherein the nested web page pointer and the third web page pointer are also retrieved.

10. The method of claim 5, wherein the control is one of a hyperlink, a search function, and an applet.

11. The method of claim 5, wherein the browser function is one of a back button and a forward button.

12. The method of claim 5, wherein the previously visited web page is the first web page.

13. The method of claim 5, wherein the previously visited web page was previously activated by selecting a control on the second web page.

14. A data processing system for creating a graphic representation of a navigation path of web page identifiers, the method comprising:

initiating means for initiating a session;

accessing means for accessing a first web page;

caching means for caching a first web page identifier associated with the first web page;

first activating means for activating a second web page from the first web page, wherein a second web page identifier is associated with the second web page and the second web page is activated from the first web page by selecting a control in the first web page; and first storage means for storing, in association with the first web page identifier, a nested web page pointer to the second web page identifier, wherein the nested web page pointer defines a navigation path from a first web page to a second web page;

creating means for creating a graphic representation of the navigation path;

second activating means for activating a previously visited web page from the second web pages wherein the previously visited web page is activated from the second web page by selecting a browser function; and second storage means for storing, in association with the second web page identifier, a navigation web page pointer to a previously visited web page identifier associated with the previously visited web page.

15. The system recited in claim 14 further comprising:

accessing means for accessing the second web page;

caching means for caching the second web page identifier associated with the second web page; and caching means for caching the first web page identifier in association with the second web page identifier.

16. The system recited in claim 15 further comprising:

ending means for ending the session;

initiating means for initiating a new session; and retrieving means for retrieving the first web page identifier, wherein the nested web page pointer is also retrieved.

17. The system recited in claim 14 further comprising:

activating means for activating a third web page from the first web page, wherein a third web page identifier is associated with the third web page; and means for storing a third web page pointer in association with the first web page identifier, wherein the first web page is associated with the second web page and the third web page.

18. The system recited in claim 17 further comprising:

retrieving means for retrieving the first web page identifier, wherein the nested web page pointer and the third web page pointer are also retrieved.

19. A data processing system for creating a graphic representation of a navigation path of web page identifiers, the system comprising:

first display means for displaying a history table having at least a first entry for a first web page, wherein the first entry includes a graphic representation of a navigation path and at least one of a web page identifier, a location, a first visited time, a last visited time, and an expiration;

expanding means for expanding the navigation path containing at least a second web page identifier to form an expanded navigation path, in response to accessing the graphic representation of a navigation path, wherein the first and second web page identifiers define a navigation path from the first web page to a second web page;

second display means for displaying the expanded navigation path; and opening means for opening the second web page, in response to accessing the second web page identifier in the expanded navigation path.

20. The system recited in claim 19, wherein the navigation path contains a third web page identifier and wherein the first second, and third web page identifiers define a navigation path from the first web page to a third web page.

21. A software program product for performing method for creating a graphic representation of a navigation path of web page identifiers in a data processing, embodied on a computer readable medium and implemented in a series of instructions, the instructions comprising:

initiating instructions for initiating a session;

accessing instructions for accessing a first web page;

caching instructions for caching a first web page identifier associated with the first web page;

activating instructions for activating a second web page from the first web page, wherein a second web page identifier is associated with the second web page and the second web page is activated from the first web page by selecting a control in the first web page;

storing instructions for storing, in association with the first web page identifier, a nested web page pointer to instructions for caching the second web page identifier, wherein the nested web page pointer defines a navigation path from the first web page to the second web page;

creating instructions for a graphic representation of the navigation path;

activating instructions for activating a previously visited web page from the second web page, wherein the previously visited web page is activated from the second web page by selecting a browser function; and storing instructions for, in association with the second web page identifier, a navigation web page pointer to a previously visited web page identifier associated with the previously visited web page.

22. A data processing implemented method for creating a graphic representation of a navigation path of web page identifiers, the method comprising:

opening a history table having a graphic representation of a navigation path containing at least a first web page identifier wherein the graphic representation of a navigation path having at least one of a representation for a forward path, a representation for a backward path, and a representation for a combination thereof; and in response to selecting a first web page identifier navigation path, expanding the graphic representation of the first web page identifier navigation path containing at least a second web page identifier wherein the first and second web page identifiers define a navigation path from a first web page to a second web page.

23. A software program product for creating a graphic representation of a navigation path of web page identifiers in a data processing, embodied on a computer readable medium and implemented in a series of instructions, comprising:

instructions for displaying a history table having at least a first entry for a first web page, wherein the first entry includes a graphic representation of a navigation path and at least one of a web page identifier, a location, a first visited time, a last visited time, and an expiration;

instructions for expanding, in response to accessing the graphic representation of a navigation path, the navigation path containing at least a second web page identifier to form an expanded navigation path, wherein the first and second web page identifiers define a navigation path from the first web page to a second web page;

instructions for displaying the expanded navigation path; and instructions for opening, in response to accessing the second web page identifier in the expanded navigation path, the second web page.

* * * * *